US012789079B2

(12) United States Patent
Liu

(10) Patent No.: US 12,789,079 B2
(45) Date of Patent: Nov. 10, 2026

(54) CLAW MACHINE

(71) Applicant: GUANGZHOU PLAYMORE ANIMATION TECHNOLOGY CO., LTD., Guangzhou (CN)

(72) Inventor: Yanqiu Liu, Guangzhou (CN)

(73) Assignee: GUANGZHOU PLAYMORE ANIMATION TECHNOLOGY CO., LTD., Guangzhou (CN)

( * ) Notice: Subject to any disclaimer, the term of this patent is extended or adjusted under 35 U.S.C. 154(b) by 284 days.

(21) Appl. No.: 18/675,117

(22) Filed: May 27, 2024

(65) Prior Publication Data

US 2025/0128148 A1 Apr. 24, 2025

(30) Foreign Application Priority Data

Oct. 19, 2023 (CN) ......................... 202322809759.1

(51) Int. Cl.
*A63F 9/30* (2006.01)
*G07F 17/32* (2006.01)

(52) U.S. Cl.
CPC ............ *A63F 9/30* (2013.01); *G07F 17/3202* (2013.01); *G07F 17/3216* (2013.01); *G07F 17/3297* (2013.01)

(58) Field of Classification Search
CPC .. A63F 9/30; A63F 2300/64; A63F 2300/643; A63F 2300/646; G07F 17/3202; G07F 17/3216; G07F 17/3297
See application file for complete search history.

(56) References Cited

U.S. PATENT DOCUMENTS

2025/0090942 A1* 3/2025 Wei ........................... A63F 9/30
2025/0128148 A1* 4/2025 Liu ........................... A63F 9/30

FOREIGN PATENT DOCUMENTS

CN 220614034 U * 3/2024
JP 3247358 U * 7/2024
KR 20020067847 A * 8/2002 ......... G07F 17/3297
WO WO-9208530 A1 * 5/1992 ............. G07F 17/32

* cited by examiner

*Primary Examiner* — Christopher R Legendre

(57) ABSTRACT

A claw machine includes a control mechanism, a body, a mounting box, a second driving mechanism, a mounting rack, third driving mechanisms, and claw assemblies. The driving portion has a power output end connected with the mounting box, to drive the mounting box to slide in a first direction. The second driving mechanism is mounted on the mounting box and has a power output end connected with the mounting rack, to drive the mounting rack to slide in a second direction. The third driving mechanisms are mounted on the mounting rack, spaced apart from one another. Each third driving mechanism has a power output end connected with one of the claw assemblies in one-to-one correspondence to drive it to slide in the second direction. Each claw assembly comprises a claw and a fourth driving mechanism mounted on the claw to drive the claw to open and close.

10 Claims, 10 Drawing Sheets

CLAW MACHINE

CROSS-REFERENCE TO PRIOR APPLICATION

This application claims the benefit of the priority of Chinese Patent Application No. 202322809759.1 filed on Oct. 19, 2023, the contents of which are incorporated herein by reference.

TECHNICAL FIELD

The disclosure relates to the technical field of amusement equipment, more particularly to a claw machine.

BACKGROUND

Existing claw machines usually use a claw to grasp a prize, carry it to the drop area, and unload it there. Then, the prize may be dropped into the pickup chute through the drop area, and users can pick up the prize in the pickup chute.

Existing claw machines, which usually have a structure with one single claw and allow a user to control the one single claw for grip at a time, are low in interestingness and have less attraction for users.

SUMMARY

The disclosure aims to provide a claw machine with a plurality of independently controlled claws for simultaneously gripping a plurality of prizes, to increase interestingness for users.

In order to achieve the above goal, the disclosure provides a claw machine, which comprises a control mechanism, a body, a first driving mechanism, a mounting box, a second driving mechanism, a mounting rack, a plurality of third driving mechanisms, and a plurality of claw assemblies. The first driving mechanism is mounted on the body, and the first driving mechanism has a power output end connected with the mounting box and is configured to drive the mounting box to slide in a first direction. The second driving mechanism is mounted on the mounting box, and the second driving mechanism has a power output end connected with the mounting rack and is configured to drive the mounting rack to slide in a second direction. The plurality of third driving mechanisms are mounted on the mounting rack, spaced apart from one another. Each of the plurality of third driving mechanisms has a power output end connected with one of the plurality of claw assemblies in one-to-one correspondence, to drive it to slide in the second direction. Each of the plurality of claw assemblies comprises a claw and a fourth driving mechanism mounted on the claw to drive the claw to open and close;

Herein, the control mechanism is electrically connected with the first driving mechanism, the second driving mechanism, each of the plurality of third driving mechanisms, and each of the plurality of fourth driving mechanisms, respectively;

Herein, the first direction, the second direction, and the third direction are perpendicular to one another.

In particular, a slider groove and a slider, which cooperate with each other to guide sliding, may be provided between the body and the mounting box. The first driving mechanism may comprise a first drive motor, a first elastic winder, a second elastic winder, and a conveyor belt. The first elastic winder and the second elastic winder may be respectively rotatably mounted on two ends of the body, two ends of the conveyor belt may be respectively connected with the first elastic winder and the second elastic winder, and a middle portion of the conveyor belt may be connected with the mounting box.

More particularly, the slider groove may be provided on a bottom surface of the body, the slider may be mounted on a top surface of the mounting box, and the first elastic winder and the second elastic winder may be respectively disposed at two ends of the slider groove. The conveyor belt may be accommodated in the slider groove, and the middle portion of the conveyor belt may be connected with the slider.

More particularly, the claw machine may comprise two of said bodies. The two bodies may be arranged in parallel and spaced apart from each other. Each body may be provided with the first elastic winder, the conveyor belt, and the second elastic winder, which are drivingly connected in such order. The bodies respectively cooperate with the mounting box to achieve sliding connection by using the slider groove and the slider. A connecting rod may be provided between the two bodies, and two ends of the connecting rod may be connected with the two first elastic winders, respectively.

More particularly, a first position sensor may be provided to sense a relative position of the mounting box and the body. The first position sensor may be electrically connected with the control mechanism.

More particularly, the second driving mechanism may comprise a second drive motor, a reel, a hanging wire, and a wire guiding wheel. Herein, the mounting box may be provided with an accommodating cavity for accommodating the second drive motor and the reel. The reel and the wire guiding wheel may be rotatably arranged in the mounting box and are spaced apart from each other. The power output end of the second drive motor may be connected with the reel, to drive the reel to rotate. The hanging wire may have one end connected with the reel, and anther end wound around a circumference of the wire guiding wheel and then extending through the bottom of the mounting box to connect with the mounting rack.

In particular, the bottom of the mounting box may be provided with a return groove for accommodating the top portion of the mounting rack.

More particularly, the mounting rack and the return groove may be respectively provided with a return element and a return hole fitting to receive the return element.

In particular, the mounting box may be provided at its bottom with a second position sensor for sensing the mounting rack, and the second position sensor may be electrically connected with the control mechanism.

In particular, the third driving mechanisms and the fourth driving mechanisms may be actuators.

Compared with the existing technologies, the claw machine of the disclosure has advantages as follows. 1. It has the plurality of claw assemblies, which allows a plurality of prizes to be simultaneously gripped in one gripping operation and thus increases interestingness in gripping; 2. Each claw assembly can be independently controlled to slide up and down, which enables high precision gripping operation.

1. body; 101. slider groove;

2. first driving mechanism; 201. first drive motor; 202. first elastic winder; 203. second elastic winder; 204. conveyor belt;

3. mounting box; 301. slider; 302. connecting rack; 3021. through hole;

4. second driving mechanism; 401. second drive motor; 402. winding and unwinding device-reel; 403. hanging wire; 404. wire guiding wheel;

5. mounting rack; 501. return element;

6. third driving mechanism;

7. claw assemblies; 701. claws; 702. fourth driving mechanism;

8. connecting rod;

9. first position sensor; 901. sensing component; 902. blocking plate;

10. return groove; 1001. return hole;

11. second position sensor; 1101. micro switch; 11011. trigger head; 1102. trigger element; 11021. pressing portion; 11022. bearing portion;

X. first direction; Y. second direction; Z. third direction.

DETAILED DESCRIPTION OF ILLUSTRATED EMBODIMENTS

Implementations of the disclosure will be further explained below in detail with reference to drawings and embodiments. The embodiments are illustrative and are not intended to limit the scope.

It should be understood that the terms, such as "upper", "lower", "left", "right", "front", "rear", "inner", "outer", "transverse", and "longitudinal" as used in the description, refer to position and orientation relationships in accordance with drawings for convenience of description and for the purpose of simplicity. They are not intended to indicate a limitation in terms of specific orientation or configuration and operation with specific orientation to the described device, component, or element and should not be regarded as limiting. The meanings of the terms used herein may be understood by those skilled in the art in accordance with specific conditions.

It should be noted that the terms such as "arrange", "provide", "connect" and "dispose" used in the description are intended to have meanings commonly understood in a broad sense. For example, "connect" may refer to fixedly connect, or detachably connect, or integrally connect; or mechanically connect, or electrically connect; or directly connect, or indirectly connect via an intermedium, or internally communicate between two devices, components, or elements. The particular meanings of the terms used herein may be understood by those skilled in the art in accordance with specific conditions.

In addition, the terms "first", "second", and the like used therein are intended to distinguish different devices, components, or elements (in same or different type and configuration) and are not intended to indicate or imply relative importance or hint the quantity of the devices, components, or elements. Unless explicitly stated otherwise, it should be understood that "plurality" used herein refers to two or more.

The technical solution of the disclosure will be further explained below in conjunction with the embodiments and drawings.

Figure 1:
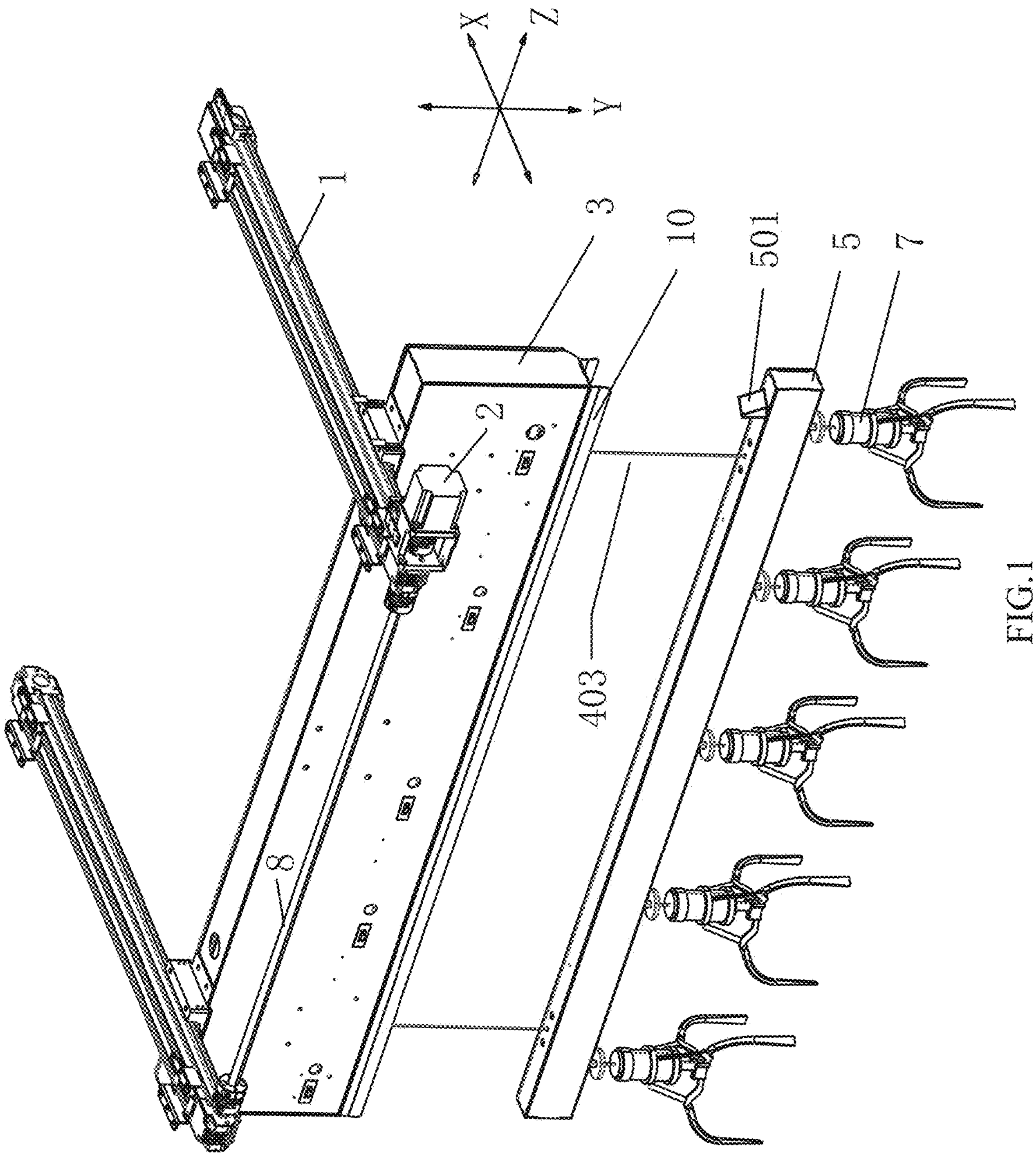
FIG. 1 is a view illustrating an overall structure of a claw machine according to an embodiment of the disclosure.
Figure 2:
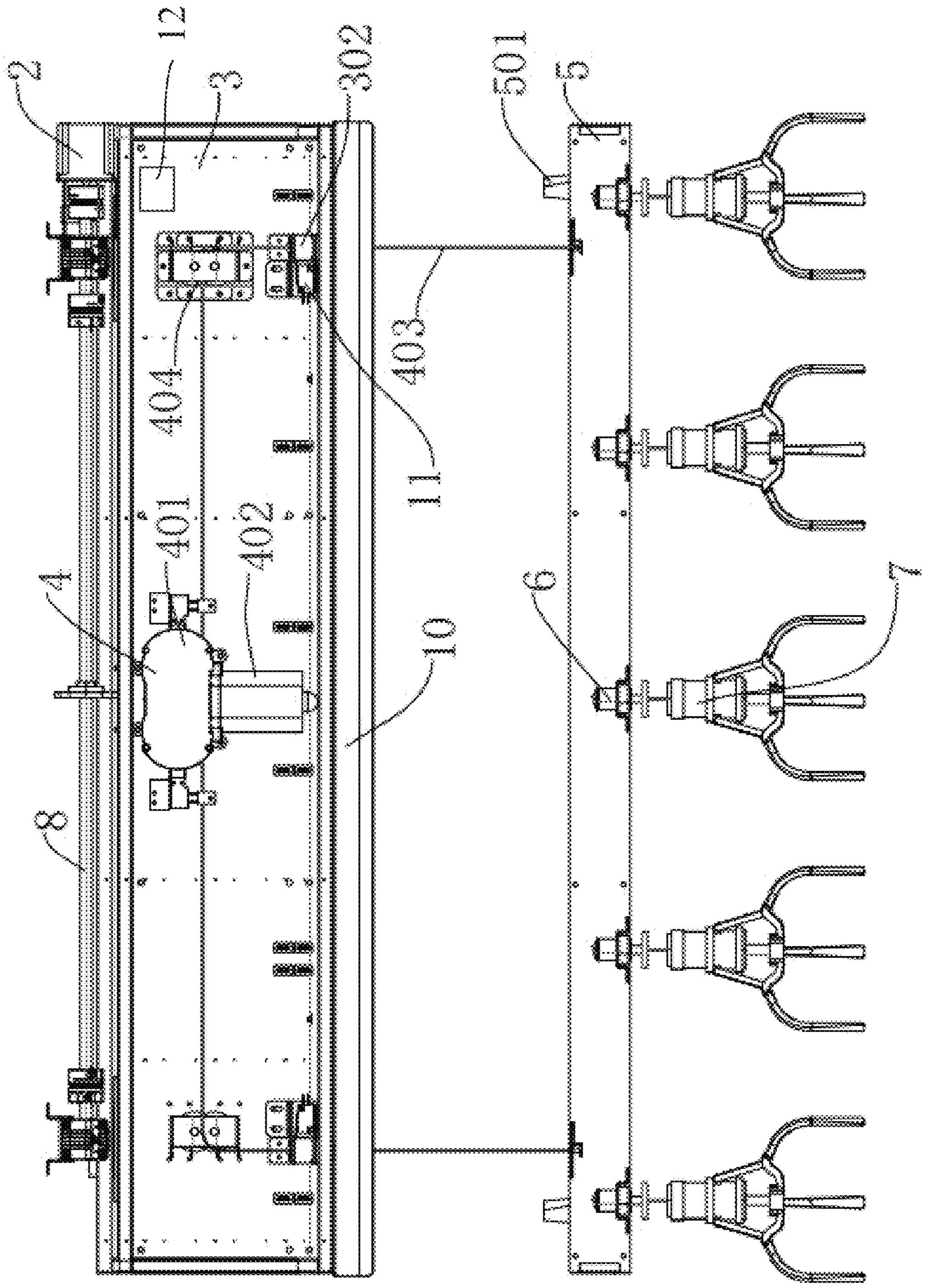
FIG. 2 is a front view of a claw machine according to an embodiment of the disclosure.
Figure 3:
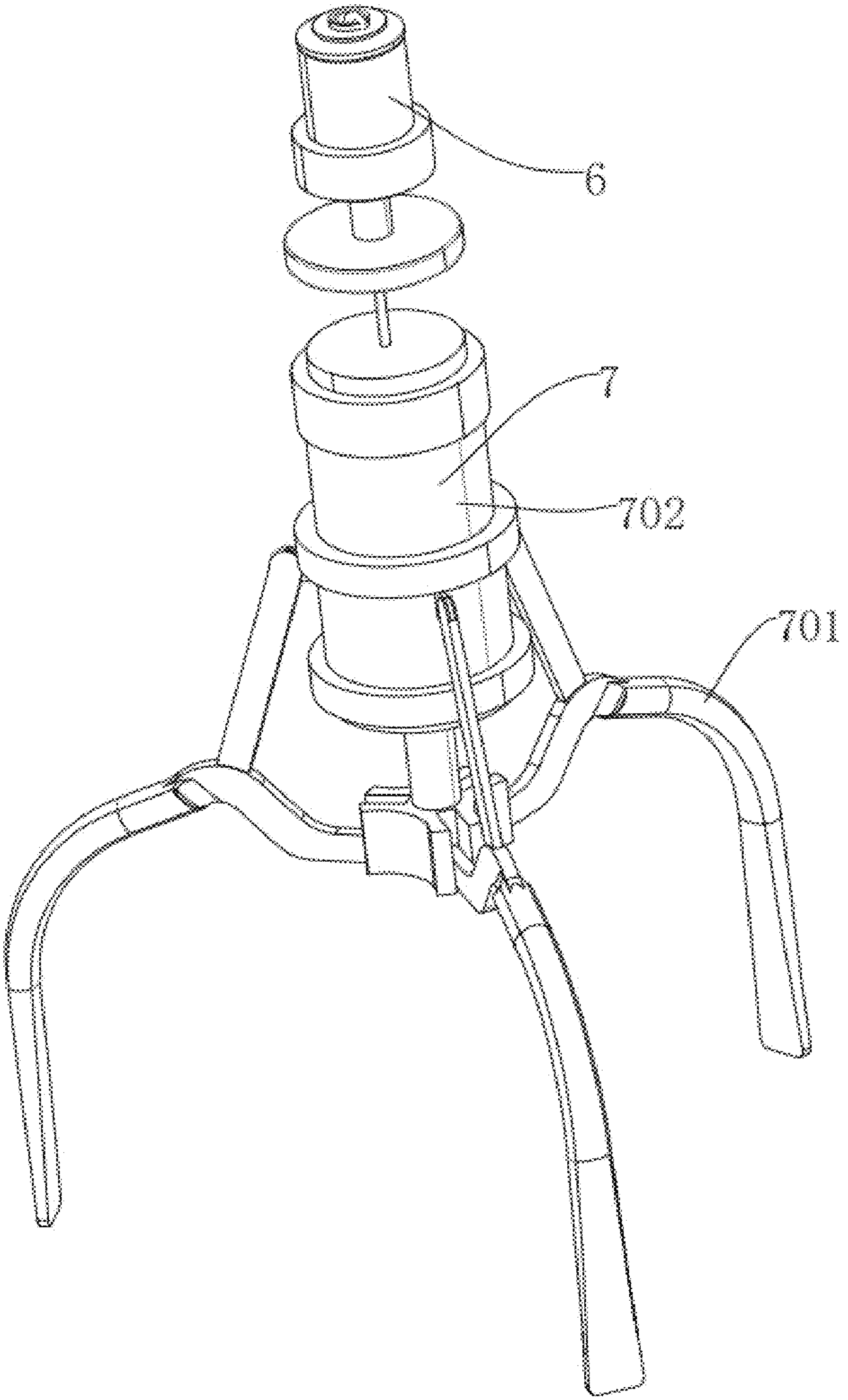
FIG. 3 is a view illustrating a structure of a third driving mechanism and a claw assembly of a claw machine according to an embodiment of the disclosure.

Referring to FIGS. 1, 2, and 3, the claw machine according to a preferred embodiment of the disclosure comprises a control mechanism 12, a body 1, a first driving mechanism 2, a mounting box 3, a second driving mechanism 4, a mounting rack 5, a plurality of third driving mechanisms 6, and a plurality of claw assemblies 7. The driving portion includes the body 1 and the first driving mechanism 2. The first driving mechanism 2 is mounted on the body 1, and the first driving mechanism 2 which has a power output end connected with the mounting box 3 is configured to drive the mounting box 3 to slide in a first direction X. The second driving mechanism 4 is mounted on the mounting box 3, and the second driving mechanism 4 which has a power output end connected with the mounting rack 5 is configured to drive the mounting rack 5 to slide in a second direction Y. The plurality of third driving mechanisms 6 are mounted on the mounting rack 5 along a third direction Z, spaced apart from one another. Each of the plurality of third driving mechanisms 6 has a power output end connected with one of the plurality of claw assemblies 7 in one-to-one correspondence so as to drive it to slide in the second direction Y. Each of the plurality of claw assemblies 7 comprises a claw 701 and a fourth driving mechanism 702 mounted on the claw 701 so as to drive the claw 701 to open and close.

The control mechanism is electrically connected with the first driving mechanism 2, the second driving mechanism 4, each of the plurality of third driving mechanisms 6, and each of the plurality of fourth driving mechanisms 702, respectively.

Herein, the first direction X, the second direction Y, and the third direction Z are perpendicular to one another.

According to the above technical solution, by means of the control mechanism, a user may first control the first driving mechanism 2 to drive the mounting box 3 to slide in the first direction X, and control the second driving mechanism 4 to drive the mounting rack 5 to slide in the second direction Y, thereby enabling the claw assemblies 7 to arrive at a preliminary location. Then, the plurality of third driving mechanisms 6 may be respectively controlled to respectively drive respective claw assemblies 7 to slide in the second direction Y, thereby enabling the plurality of claw assemblies 7 to exactly arrive at the location for grip. Then, the plurality of claw assemblies 7 can perform simultaneous gripping. Alternatively, the control mechanism may be configured to allow users to control only the first driving mechanism 2 for driving the mounting box 3 to slide in the first direction X, and to directly control dropping and gripping of the claw assemblies 7 to simultaneously grasp a plurality of prizes by means of the control mechanism.

Due to the plurality of claw assemblies 7, several prizes may be simultaneously grasped in one gripping operation, providing increased interestingness of grip. As each of the plurality of claw assemblies 7 can slide up and down independently, it provides better accuracy.

Preferably, referring to FIGS. 4, 5, 6, and 7, a slider groove 101 and a slider 301, which cooperate with each other to guide sliding, may be provided between the body 1 and the mounting box 3. The first driving mechanism 2 comprises a first drive motor 201, a first elastic winder 202, a second elastic winder 203, a conveyor belt 204. Herein, the first elastic winder 202 and the second elastic winder 203 are respectively rotatably mounted on two ends of the body 1, two ends of the conveyor belt 204 are respectively connected with the first elastic winder and the second elastic winder, and a middle portion of the conveyor belt 204 is connected with the mounting box 3. The first drive motor 201 is configured to drive the first elastic winder 202 to rotate, so as to allow the conveyor belt 204 to unwind from the second elastic winder 203 and wind around the first elastic winder 202, or to unwind from the first elastic winder 202 and wind around the second elastic winder 203. In such a case, it achieves displacement of the conveyor belt 204 relative to the body 1.

More preferably, the slider groove 101 may be provided on the bottom surface of the body 1, the slider 301 may be mounted on the top surface of the mounting box 3, and the first elastic winder 202 and the second elastic winder 203 may be respectively disposed at two ends of the slider groove 101. The conveyor belt 204 may be accommodated in the slider groove 101, and the middle portion of the conveyor belt 204 may be connected with the slider 301. In such a case, the conveyor belt 204 can transmit the power of the first drive motor 201 to the slider 301 and drive the slider 301 to slide in the slider groove 101. Consequently, the mounting box 3 can be driven to slide in the first direction X stably and reliably.

More preferably, the claw machine may comprise two bodies 1 arranged in parallel and spaced apart from each other. Each one of the bodies 1 is provided with the first elastic winder 202, the conveyor belt, and the second elastic winder 203, which are drivingly connected in such order. The bodies 1 respectively cooperate with the mounting box 3 to achieve sliding connection by using the slider groove 101 and the slider 301, respectively. A connecting rod 8 may be provided between the two bodies 1, and two ends of the connecting rod 8 may be connected with the two first elastic winders 202, respectively. With the arrangement of the two bodies 1 spaced apart from each other and the connecting rod 8 for transmitting the power of the first drive motor 201 to the other body, the mounting box 3 can slide more stable due to constant power and synchronous sliding.

Figure 4:
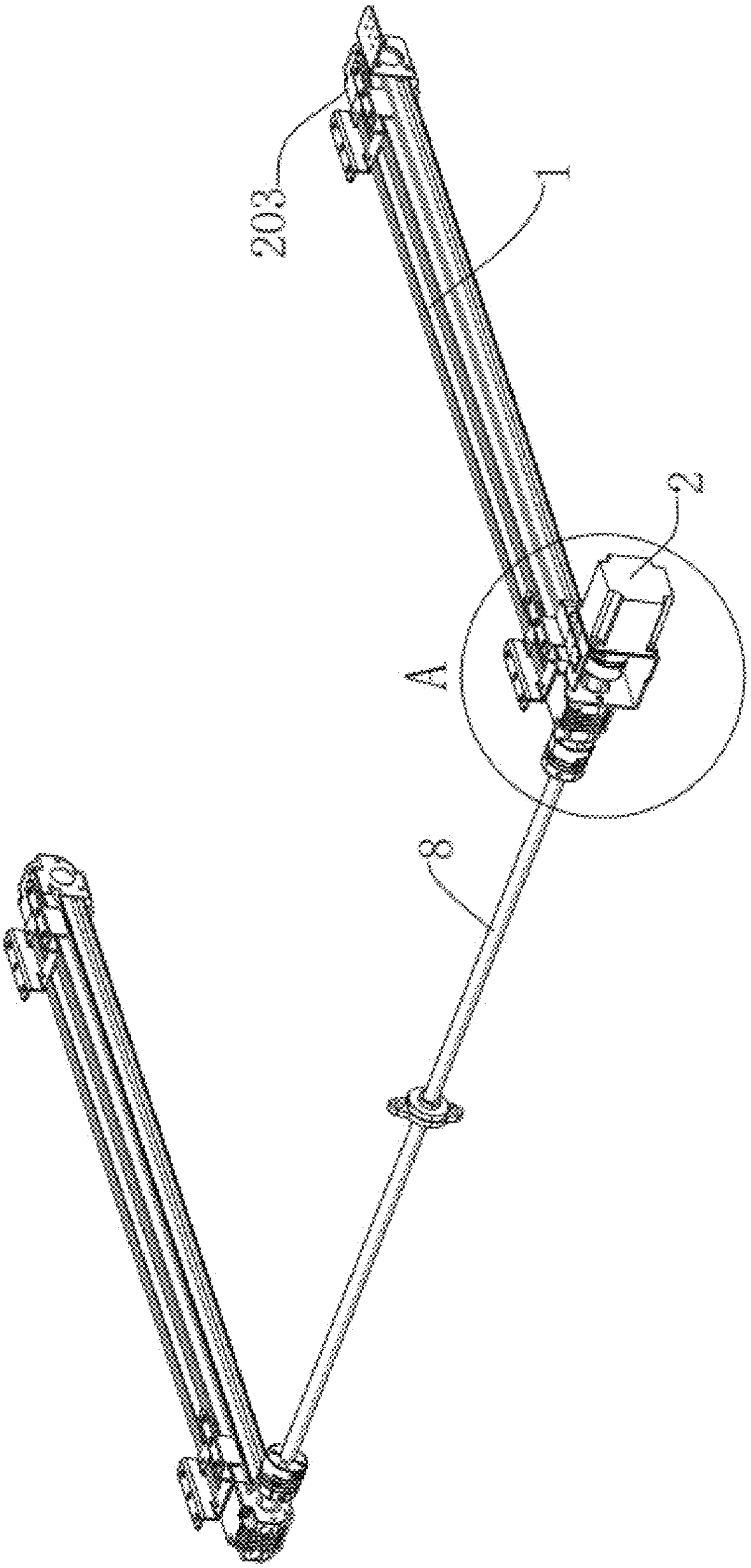
FIG. 4 is a view illustrating a structure of bodies, a first driving mechanism, a connecting rod, and a bearing housing of a claw machine according to an embodiment of the disclosure.
Figure 5:
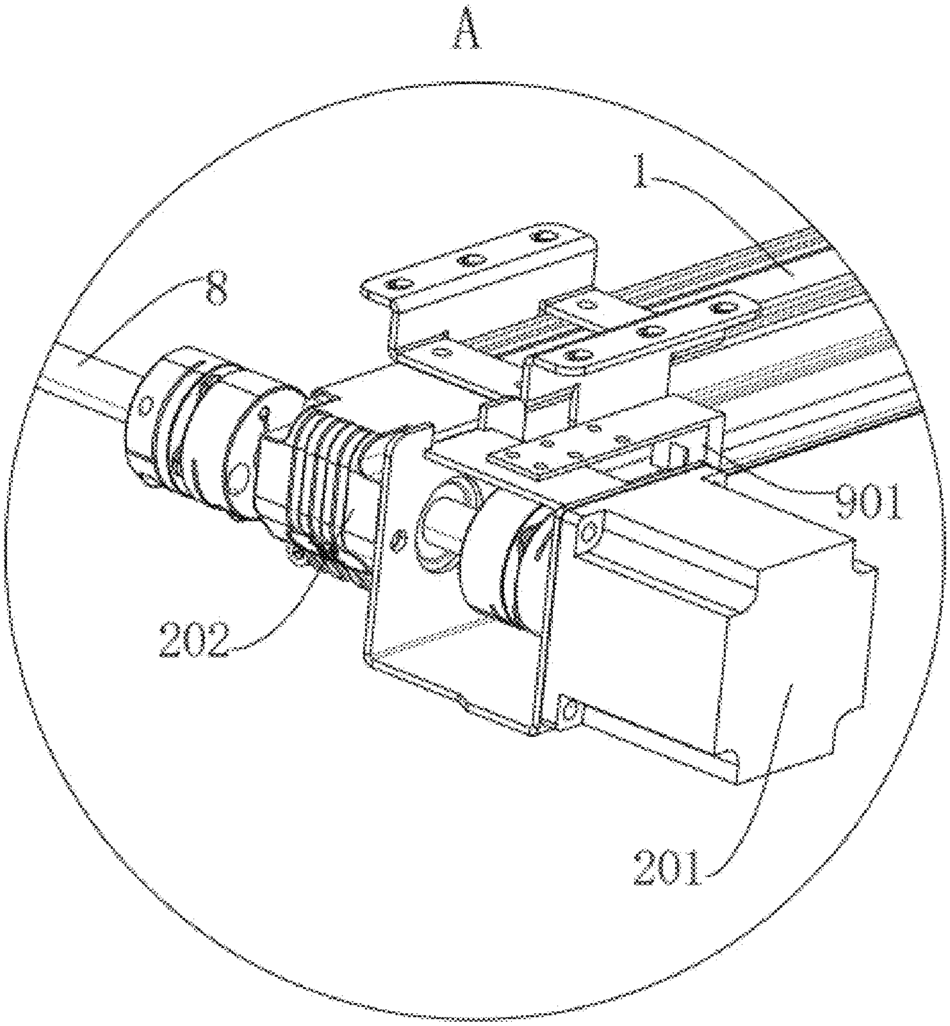
FIG. 5 is a partial enlarged view of the area A of FIG. 4.
Figure 6:
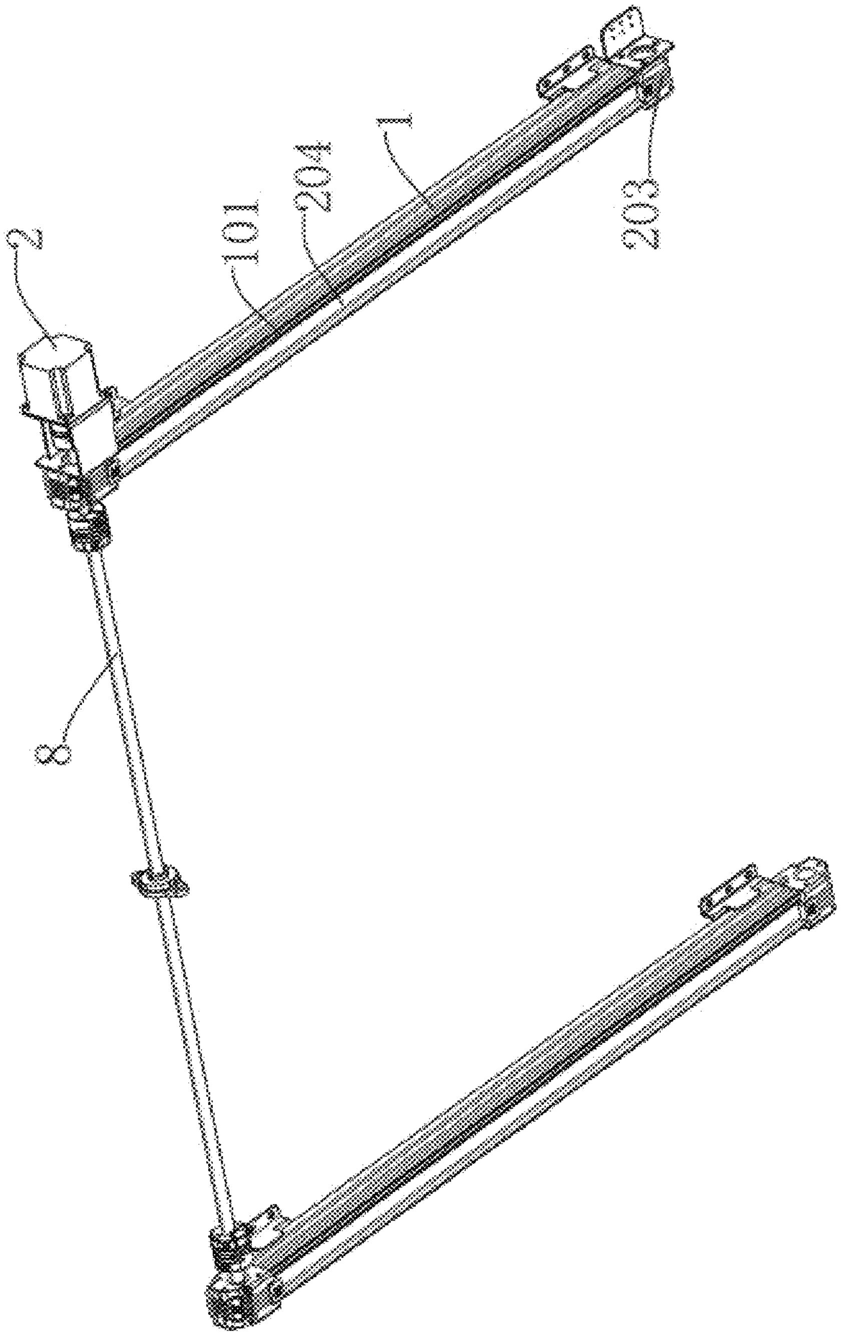
FIG. 6 is a view illustrating a structure of bodies, a first driving mechanism, a connecting rod, and a bearing housing of a claw machine according to an embodiment of the disclosure, viewed from another angle.

In some preferred embodiments, in particular referring to FIG. 4, a bearing housing is sleeved on the middle portion of the connecting rod 8 such that the connecting rod 8 is rotatable relative to the bearing housing. The bearing housing provided on the connecting rod 8 can ensure precise coaxiality of the two first elastic winders 202 and avoid big coaxiality error which may affect smooth sliding of the mounting box 3.

More preferably, a first position sensor 9 may be provided to sense the position of the mounting box 3 relative to the body 1. The first position sensor 9 may be electrically connected with the control mechanism. By virtue of the first position sensor 9, the sliding range of the mounting box 3 can be limited.

Figure 7:
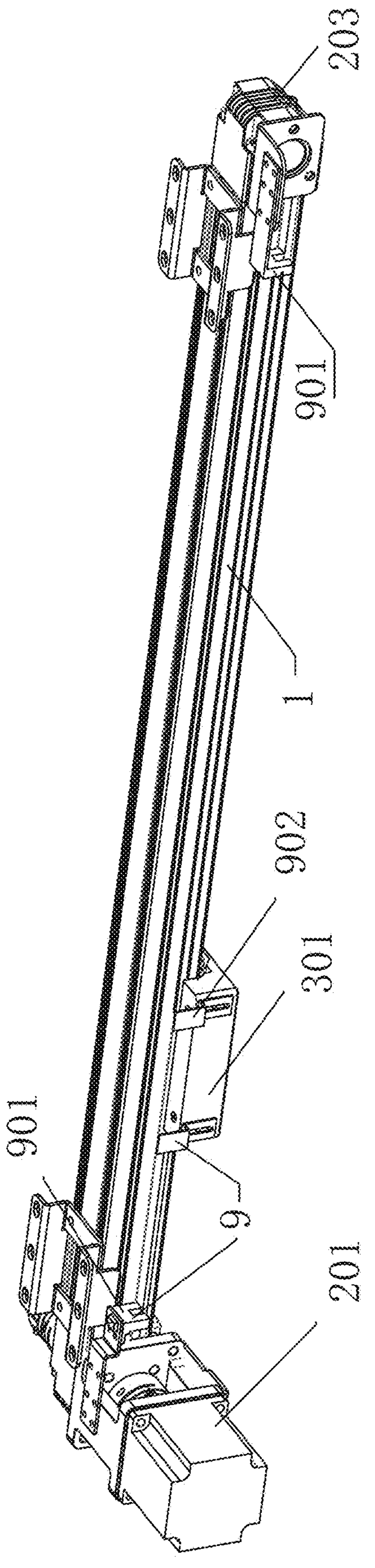
FIG. 7 is a view illustrating a structure of a body, a first driving mechanism, a slider, and a first position sensor of a claw machine according to an embodiment of the disclosure.

In some preferred embodiments, in particular referring to FIG. 7, the first position sensor 9 may comprise a sensing component 901 and a blocking plate 902. Two ends of each body 1 are respectively provided with the sensing component 901, and the slider 301 is provided with blocking plates 902 for respectively cooperating with a sensing component 901 for achieving sensing. The control mechanism may be configured to control the first drive motor 201 to stop operation when the outgoing beam emitted from a sensing component 901 is blocked by a blocking plate 902, which indicates that the mounting box 3 has already been displaced to a maximum displacement position.

More preferably, referring to FIG. 2, the second driving mechanism 4 comprises a second drive motor 401, a reel 402, a hanging wire 403, and a wire guiding wheel 404. Herein, the mounting box 3 may be provided with an accommodating cavity for accommodating the second drive motor 401 and the reel 402. The reel 402 and the wire guiding wheel 404 are rotatably arranged in the mounting box 3 and are spaced apart from each other. The power output end of the second drive motor 401 is connected with the reel 402, so as to drive the reel 402 to rotate. The hanging wire 403 has one end connected with the reel 402, and anther end wound around the circumference of the wire guiding wheel 404 and then extending through the bottom of the mounting box 3 to connect with the mounting rack 5.

In some preferred embodiments, in particular referring to FIG. 2, the second drive motor 401 and the reel 402 may be disposed in the middle portion of the accommodating cavity. The wire guiding wheels 404, which are disposed at two sides of the reel 402, may be symmetric around the reel 402. The hanging wire 403 may extend through the reel 402. Two ends of the hanging wire 403 may wind around the circumference of the wire guiding wheel 404 and then extend through the bottom of the mounting box 3 to connect with the mounting rack 5. In such a manner, the mounting rack 5 can be stably hung by the hanging wire 403.

Figure 10:
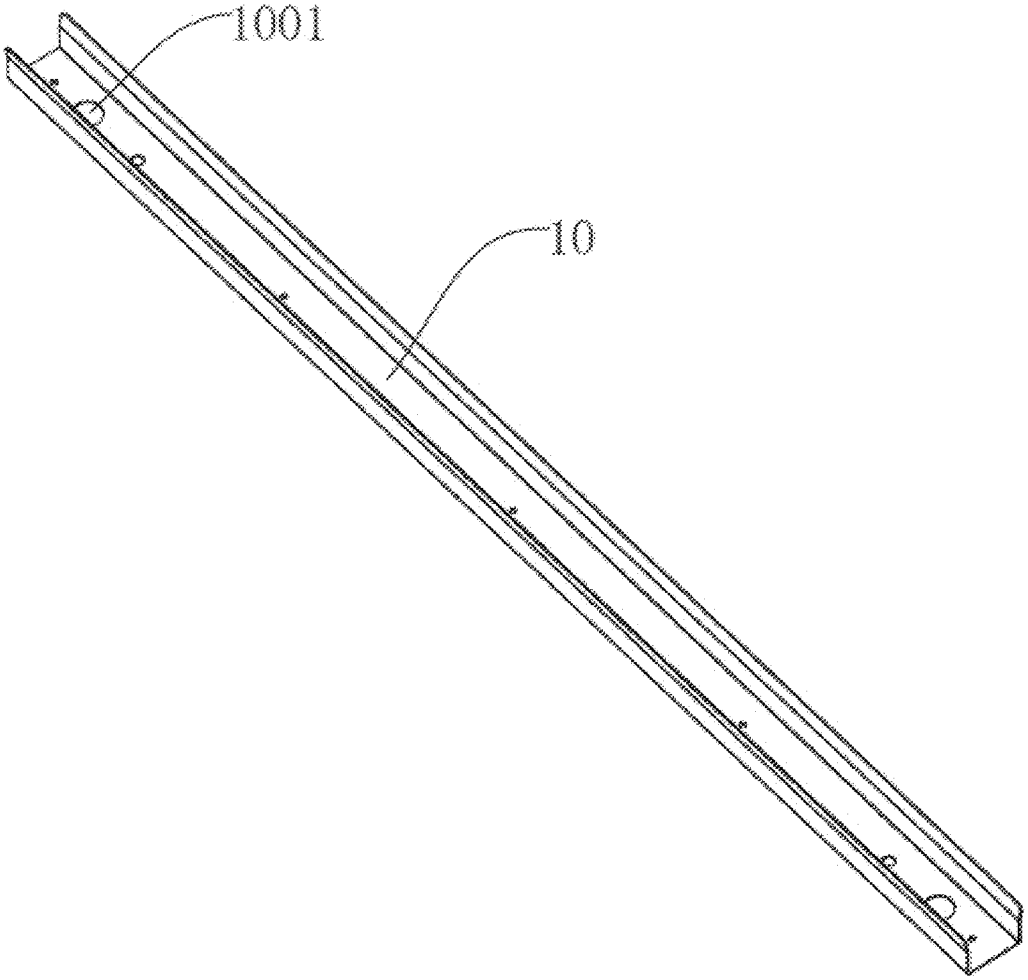
FIG. 10 is a structural view of a return groove of a claw machine according to an embodiment of the disclosure.

Preferably, referring to FIG. 10, the bottom of the mounting box 3 may be provided with a return groove 10 for accommodating the top portion of the mounting rack 5. After each grip, due to the return groove 10, the claw assemblies 7 may automatically return to original position, such that the mounting rack 5 can be accommodated in the return groove 10.

More preferably, the mounting rack 5 and the return groove 10 are respectively provided with a return element 501 and a return hole 1001 fitting to receive the return element 501. Due to the return hole 1001 and the return element 501 matching with each other to achieve positioning, the return position of the mounting rack 5 can be further limited.

Preferably, the mounting box 3 may be provided at its bottom with a second position sensor 11, which is electrically connected with the control mechanism to sense the mounting rack 5.

Figure 8:
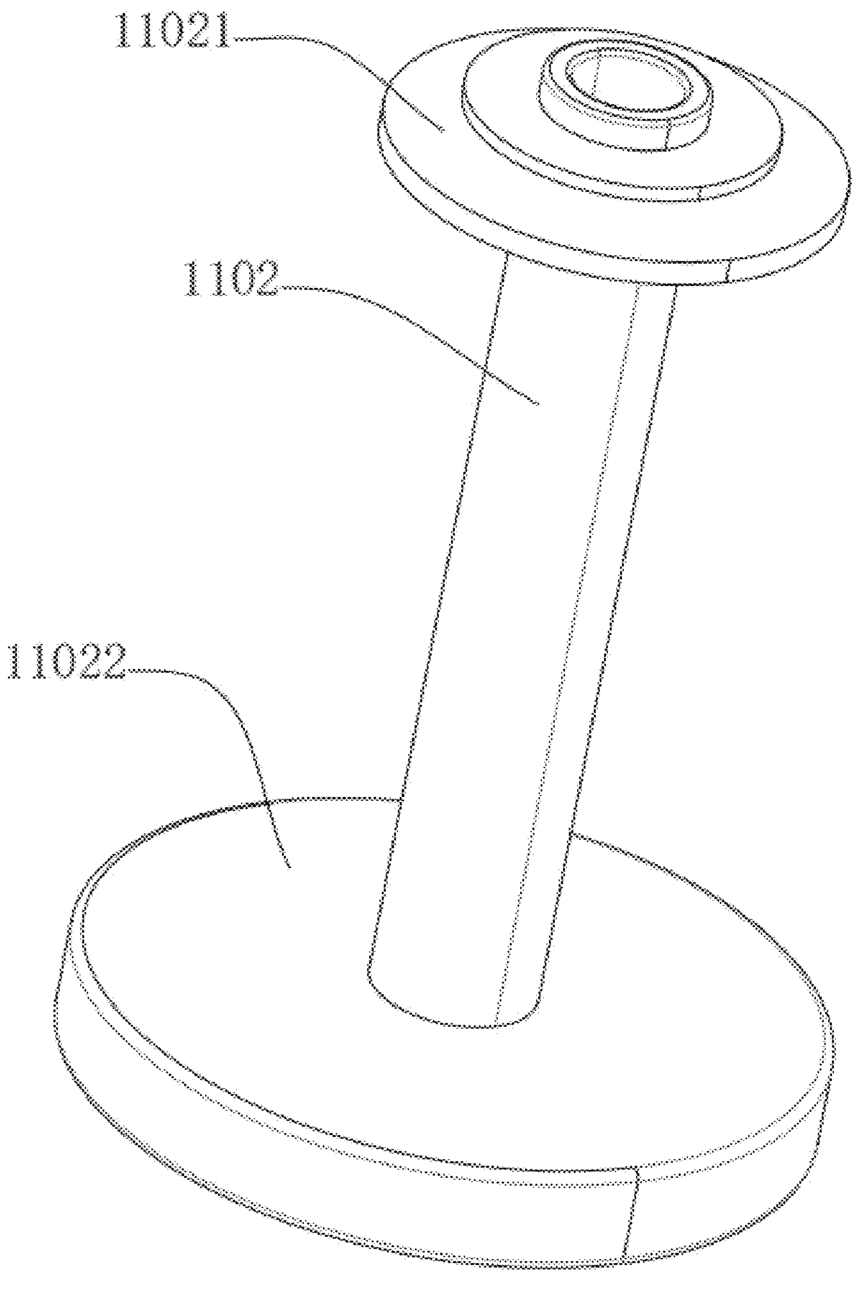
FIG. 8 is a structural view of a trigger element of a claw machine according to an embodiment of the disclosure.
Figure 9:
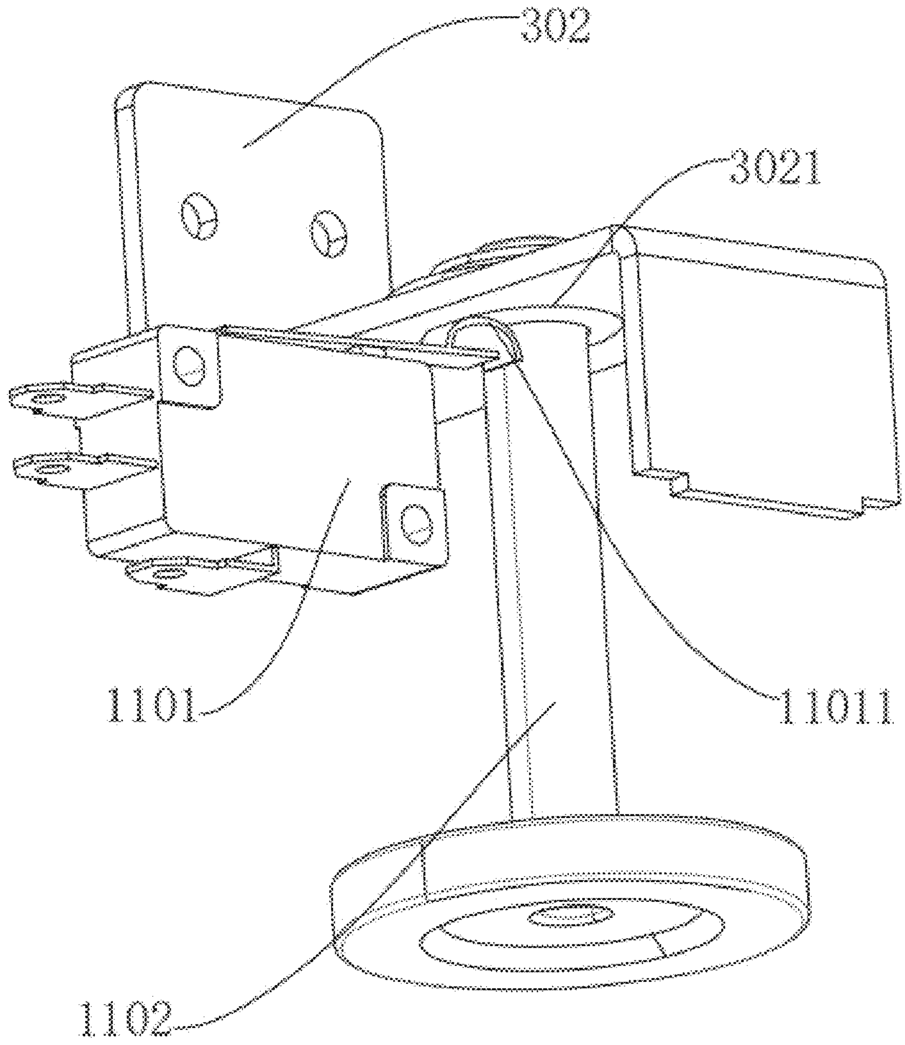
FIG. 9 is a view illustrating a structure of a connecting rack and a second position sensor of a claw machine according to an embodiment of the disclosure.

In some preferred embodiments, in particular referring to FIGS. 8 and 9, the second position sensor may comprise a micro switch 1101 and a trigger element 1102. The trigger element 1102 may be provided with a pressing portion 11021 and a bearing portion 11022 which are spaced apart from each other. A connecting rack 302 may be disposed in the accommodating cavity and may be provided with a through hole 3021. The pressing portion 11021 may be connected with the connecting rack 302. The pressing portion 11021 and the bearing portion 11022 may be spaced apart from each other and disposed in such a manner that the through hole 3021, the mounting box 3, and the return groove 10 are located between the pressing portion 11021 and the bearing portion 11022. The bearing portion 11022 is located in the return groove 10, and there is a certain gap between the bearing portion 11022 and the wall of the return groove 10. The lower end surface of the bearing portion 11022 defines a trigger end. The trigger element 1102 is slidable in the second direction Y. The micro switch 1101 may be disposed at a side of the connecting rack 302 and comprise a trigger head 11011 extending through the through hole 3021 to abut against the lower end surface of the pressing portion 11021.

The trigger element 1102 may be made of metal material, preferably copper alloy. When the pressing portion 11021 moves downwards due to its own weight, it contacts with the trigger head 11011 to complete a circuit, such that the mounting rack 5 can slide in the second direction Y. When the mounting rack 5 is displaced back into the return groove 10, the upper end surface of the mounting rack 5 abuts against the bearing portion 11022 and pushes the trigger element 1102 upwards, such that the lower end surface of the pressing portion 11021 is separated away from the trigger head 11011. In such a case, the second driving mechanism 4 cannot keep lifting the mounting rack 5 anymore. By virtue of the second position sensor 11, the sliding range of the mounting rack 5 can be limited.

Preferably, the third driving mechanisms 6 and the fourth driving mechanisms 702 may be actuators. The actuator can achieve stable driving.

In conclusion, the claw machine having the plurality of claw assemblies according to the embodiments of the disclosure allows a plurality of prizes to be simultaneously gripped in one gripping operation, which increases interestingness in gripping. The claw of each of the claw assemblies can be independently controlled to slide up and down, enabling high precision gripping operation.

All the above are merely preferred embodiments of the disclosure. It should be noted that those skilled in the art may obtain equivalents or modifications without departing from the principle of the disclosure. The invention is intended to cover all of the equivalents and modifications included within the scope of the disclosure.

The invention claimed is:

1. A claw machine, comprising: a control mechanism, a body, a first driving mechanism, a mounting box, a second driving mechanism, a mounting rack, a plurality of third driving mechanisms, and a plurality of claw assemblies, wherein the first driving mechanism is mounted on the body, the first driving mechanism has a power output end connected with the mounting box and is configured to drive the mounting box to slide in a first direction, the second driving mechanism is mounted on the mounting box, the second driving mechanism has a power output end connected with the mounting rack and is configured to drive the mounting rack to perform a sliding motion in a second direction, the plurality of third driving mechanisms are mounted on the mounting rack in a row along a third direction and spaced apart from one another, each of the plurality of third driving mechanisms has a power output end connected with one of the plurality of claw assemblies in one-to-one correspondence so as to drive the plurality of claw assemblies to slide in the second direction independently of each other and independently of the sliding motion of the mounting rack, each of the plurality of claw assemblies comprises a claw and a fourth driving mechanism mounted on the claw to drive the claw to open and close;

wherein the control mechanism is electrically connected with the first driving mechanism, the second driving mechanism, each of the plurality of third driving mechanisms, and each of the plurality of fourth driving mechanisms, respectively;

wherein the first direction, the second direction, and the third direction are perpendicular to one another.

2. The claw machine according to claim 1, wherein a slider groove and a slider, which cooperate with each other to guide sliding, are provided between the body and the mounting box, wherein the first driving mechanism comprises a first drive motor, a first elastic winder, a second elastic winder, and a conveyor belt, the first elastic winder and the second elastic winder are respectively rotatably mounted on two ends of the body, two ends of the conveyor belt are respectively connected with the first elastic winder and the second elastic winder, and a middle portion of the conveyor belt is connected with the mounting box.

3. The claw machine according to claim 2, wherein the slider groove is provided on a bottom surface of the body, the slider is mounted on a top surface of the mounting box, the first elastic winder and the second elastic winder are respectively disposed at two ends of the slider groove, the conveyor belt is accommodated in the slider groove, and the middle portion of the conveyor belt is connected with the slider.

4. The claw machine according to claim 2, wherein two of said body, two of said first elastic winder, two of said conveyor belt, and two of said second elastic winder are provided, the two bodies are arranged in parallel and spaced apart from each other, wherein the bodies, the first elastic winders, the conveyor belts, and the second elastic winders are drivingly connected, respectively, in such order, the two bodies respectively cooperate with the mounting box to achieve sliding connection by using the slider groove and the slider, a connecting rod is provided between the two bodies, and two ends of the connecting rod are connected with the two first elastic winders, respectively.

5. The claw machine according to claim 2, wherein a first position sensor is provided to sense a relative position of the mounting box and the body, the first position sensor is electrically connected with the control mechanism.

6. The claw machine according to claim 1, wherein the second driving mechanism comprises a second drive motor, a reel, a hanging wire, and a wire guiding wheel, wherein the mounting box is provided with an accommodating cavity for accommodating the second drive motor and the reel, the reel and the wire guiding wheel are rotatably arranged in the mounting box and are spaced apart from each other, the power output end of the second drive motor is connected with the reel, to drive the reel to rotate, the hanging wire has one end connected with the reel and anther end wound around a circumference of the wire guiding wheel and then extending through a bottom of the mounting box to connect with the mounting rack.

7. The claw machine according to claim 1, wherein a bottom of the mounting box is provided with a return groove for accommodating a top portion of the mounting rack.

8. The claw machine according to claim 7, wherein the mounting rack and the return groove are respectively provided with a return element and a return hole fitting to receive the return element.

9. The claw machine according to claim 1, wherein a bottom of the mounting box is provided with a second position sensor for sensing the mounting rack, and the second position sensor is electrically connected with the control mechanism.

10. The claw machine according to claim 1, wherein the third driving mechanisms and the fourth driving mechanisms are actuators.

* * * * *